(12) United States Patent
Da Silva (10) Patent No.: US 12,253,865 B2
(45) Date of Patent: Mar. 18, 2025

(54) THERMOSTATIC DEVICE FOR CONTROLLING THE CIRCULATION OF A FLUID, AND THERMOSTATIC VALVE COMPRISING SUCH A DEVICE

(71) Applicant: VERNET, Ollainville (FR)

(72) Inventor: William Da Silva, Villeconin (FR)

(73) Assignee: VERNET, Ollainville (FR)

( * ) Notice: Subject to any disclaimer, the term of this patent is extended or adjusted under 35 U.S.C. 154(b) by 187 days.

(21) Appl. No.: 17/794,958

(22) PCT Filed: Jan. 27, 2021

(86) PCT No.: PCT/EP2021/051817
§ 371 (c)(1),
(2) Date: Jul. 23, 2022

(87) PCT Pub. No.: WO2021/151921
PCT Pub. Date: Aug. 5, 2021

(65) Prior Publication Data
US 2023/0251675 A1 Aug. 10, 2023

(30) Foreign Application Priority Data

Jan. 28, 2020 (FR) ...................................... 2000812

(51) Int. Cl.
*G05D 23/02* (2006.01)
*F01P 7/14* (2006.01)
*F01P 7/16* (2006.01)

(52) U.S. Cl.
CPC .............. *G05D 23/022* (2013.01); *F01P 7/16* (2013.01); *F01P 2007/146* (2013.01)

(58) Field of Classification Search
CPC ...... G05D 23/022; F01P 7/16; F01P 2007/146
See application file for complete search history.

(56) References Cited

U.S. PATENT DOCUMENTS

2019/0195375 A1   6/2019   Oswald et al.

FOREIGN PATENT DOCUMENTS

| EP | 1024257 A2 | 8/2000 |
| EP | 1619568 A2 | 1/2006 |

(Continued)

OTHER PUBLICATIONS

Machine Translation of FR3026458A1 PDF File Name: "FR3026458A1_Machine_Translation.pdf"*

(Continued)

*Primary Examiner* — Grant Moubry
*Assistant Examiner* — Ruben Picon-Feliciano
(74) *Attorney, Agent, or Firm* — Soquel Group LLC (57) ABSTRACT

A device including a main plug controlling fluid flow between a chamber and an outside of a housing by pressing against a housing seat, and a bypass plug controlling fluid flow between the chamber and a housing lateral passage. The device includes a thermostatic element with a movable part to which the plugs are connected to control backflows. For efficiency, economy and adaptability to housing geometries, the device includes an adapter, including a tubular body, inside of which a cylindrical sleeve of the bypass plug is fitted to slide, and a lateral tubing extending from an outer face of the tubular body, which has an end for connecting to the lateral passage of the housing, and which discharges into the tubular body via a hole closed by the cylindrical sleeve when the main plug is open, the cylindrical sleeve leaving the hole open when the main plug is closed.

13 Claims, 8 Drawing Sheets

(56) References Cited

FOREIGN PATENT DOCUMENTS

| | | | | |
|---|---|---|---|---|
| FR | 2589219 | B1 | 4/1987 | |
| FR | 3026458 | A1 * | 4/2016 | ................ F01P 7/16 |
| GB | 2261934 | A | 2/1993 | |

OTHER PUBLICATIONS

PCT/EP2021/051817, International Search Report, Apr. 13, 2021, 2 pages.
FR 2000812, INPI Rapport de Recherche Preliminaire, Aug. 4, 2020, 2 pages.

* cited by examiner

THERMOSTATIC DEVICE FOR CONTROLLING THE CIRCULATION OF A FLUID, AND THERMOSTATIC VALVE COMPRISING SUCH A DEVICE

CROSS-REFERENCE TO RELATED APPLICATIONS

This application claims benefit under 35 USC § 371 of PCT Application No. PCT/EP2021/051817 entitled THERMOSTATIC DEVICE FOR CONTROLLING THE CIRCULATION OF A FLUID, AND THERMOSTATIC VALVE COMPRISING SUCH A DEVICE, filed on Jan. 27, 2021 by inventor William Da Silva. PCT Application No. PCT/EP2021/051817 claims priority of French Patent Application No. 20 00812, filed on Jan. 28, 2020.

FIELD OF THE INVENTION

The present invention relates to a thermostatic device and to a thermostatic valve comprising such a device.

The invention relates more particularly to thermostatic devices and valves which are used in internal combustion engine cooling circuits, in particular same in motor vehicles, heavy vehicles, two-wheelers and stationary engines. Nevertheless, this field of application does not limit the invention, in the sense that the device and the valve according to the invention, can be used in various other circuits for fluids, e.g. cooling circuits for gearboxes, water circuits, oil circuits, etc.

BACKGROUND OF THE INVENTION

In many applications in the fluidic field, in particular for the cooling of internal combustion engines, thermostatic valves are used to regulate the flow of a fluid, i.e. to distribute the fluid into different flow channels, generally according to the temperature of the fluid. Such valves are called thermostatic, in the sense that the displacement of the internal plug(s) thereof is(are) controlled by a thermostatic element, i.e. an element which comprises a body, containing a thermally expandable material, and a piston, dipped into the thermally expandable material, where the body and the piston can move in translation with respect to each other along an axis corresponding to the central longitudinal axis of the piston.

SUMMARY OF THE DESCRIPTION

The invention relates more specifically to three-way valves, which distribute a fluid inlet between two fluid outlets or which feed a fluid outlet via two fluid inlets. Such three-way valves are typically used to regulate the flow of a cooling fluid with regard to both an engine to be cooled by said fluid and a heat exchanger, in particular a radiator, cooling said fluid: when the fluid has a too high temperature at the valve, the latter sends same to the heat exchanger to be cooled before being sent to the engine to cool and then returned to the valve, whereas, when the temperature of the fluid is sufficiently low at the valve, the latter sends the fluid directly to the engine via a bypass channel that does not go through the heat exchanger, commonly called bypass channel. To this end, the valve includes a main plug which controls the flow of the fluid with respect to the heat exchanger, and a bypass plug, which controls the flow of the fluid along the bypass channel.

The invention relates to valves for which the same thermostatic element actuates, during the backflow, the main valve plug and the bypass plug. In such a case, provision may be made for the valve housing, to which a fixed part of the thermostatic element is rigidly connected in use, to have two seats which are aligned along the axis of the thermostatic element and against which the main and bypass plugs respectively press axially, carried by the moving part of the thermostatic element. Such solution requires that the flow channel with respect to the exchanger and the bypass channel lead axially into the housing.

When the bypass channel is lateral to the unit, i.e. same leads to the unit along a direction transverse to the axis, the bypass plug has be arranged accordingly. EP 1 619 568 proposes to make the bypass plug in the form of a flat slide, which extends parallel to the axis and which, being driven by the movable part of the thermostatic element, is movable along a flat region of the housing, through which the lateral bypass channel leads into the unit. Such solution is subject to risks of jamming of the flat slide thereof, unless means of guiding, which are expensive and generate friction, are arranged in the housing Moreover, such solution is not adaptable, in the sense that it is specific to a specific geometry of the valve housing.

The goal of the present invention is to propose an efficient and economical thermostatic device for valves with a lateral bypass channel, which would also be adaptable to various valve housing geometries.

To this end, the subject matter of the invention is a thermostatic device for regulating the flow of a fluid, the thermostatic device comprising:
- a thermostatic element, which includes a fixed part designed to be rigidly connected to a fluid channeling housing, and a movable part movable along an axis with respect to the fixed part, by moving away from the fixed part under the action of the expansion of a thermally expandable material of the thermostatic element,
- a main plug, which can be moved along the axis with respect to the fluid channeling housing between a closed position, wherein the main plug is axially pressed against a fixed seat of the fluid channeling housing so as to prevent the fluid from flowing between a chamber of the fluid channeling housing and the outside of the fluid channeling housing by crossing through the fixed seat, and an open position, wherein the main plug is moved away from the fixed seat so as to allow the fluid to flow between the chamber and the outside of the fluid channeling housing by crossing through the fixed seat, wherein said main plug is connected to the movable part of the thermostatic element so that, during the expansion of the thermally expandable material, the movable part of the thermostatic element moves the main plug from the closed position to the open position, and
- a bypass plug which is movable along the axis with respect to the fluid channeling housing so as to control the flow of fluid between the chamber and a lateral passage of the fluid channeling housing, leading to the chamber transversely to the axis, wherein said bypass plug is rigidly connected to the movable portion of the thermostatic member so as to allow the fluid to flow between the chamber and the lateral passage when the main plug is in the closed position and to prevent fluid from flowing between the chamber and the lateral passage when the main plug is in the open position, wherein the bypass plug comprises a cylindrical sleeve which is substantially centered on the axis, and wherein the thermostatic device further comprises an adapter, which is suited for being fixedly added to the fluid channeling housing inside the chamber and which comprises:
a tubular body, which is substantially centered on the axis and inside which the cylindrical sleeve is neatly fitted and is slidable along the axis, and
a lateral tubing, which extends from an outer lateral face of the tubular body, which has, opposite the tubular body, an end for connecting to the lateral passage of the fluid channeling housing, and which leads via a hole to the inside of the tubular body in a transverse direction to the axis, the hole being closed by the cylindrical sleeve when the main plug is in the open position whereas the cylindrical sleeve leaves the hole open when the main plug is in the closed position.

The invention further relates to a thermostatic valve, comprising a thermostatic device as defined above, and a fluid channeling housing which comprises:
a fixed seat against which the main plug of the thermostatic device is pressed axially when the main plug is in the closed position,
a chamber inside which the adapter of the thermostatic device is attached to the fluid channeling housing, and
a lateral passage, which leads to the chamber transversely to the axis, the flow of a fluid between the lateral passage and the chamber being controlled by the bypass plug of the thermostatic device.

One of the ideas underlying the invention is to integrate into the thermostatic device, an adapter which can be adapted to the geometric specificities of the valve housing wherein the thermostatic device is to be installed. Such adapter is connected, via a lateral tube, to the lateral passage of the housing, typically associated with a bypass channel. The flow of the fluid between the lateral passage and the chamber inside the housing is controlled by a cylindrical sleeve of the bypass plug, which slides in a fitted way in a tubular body of the adapter so as to open and close off the discharge from the lateral tubing into the tubular body. The mating between the cylindrical sleeve of the bypass plug and the tubular body of the adapter provides a long centering of the cylindrical sleeve and hence an efficient and reliable guiding of the latter, irrespective of the geometry of the housing. The lateral tubing of the adapter is easily adapted to the geometrical specificities of the housing, in particular by appropriate shaping of the end thereof opposite the tubular body of the adapter. Moreover, the adapter can advantageously have additional arrangements, which will be described in detail thereafter, for reinforcing the practicality and the performance of the thermostatic device according to the invention.

According to advantageous additional features of the thermostatic device according to the invention:
The thermostatic device further comprises a spring which is compressed along the axis and which returns the movable part toward the fixed part of the thermostatic element during the contraction of the thermally expandable material so as to move the main plug from the open position to the closed position.
The spring is axially pressed against the adapter.
The thermostatic device further comprises a holding piece which is rigidly attached to the movable part of the thermostatic element and which is suited to axially hold the adapter with respect to the movable part of the thermostatic element against thrust of the spring before the adapter is fixedly added to the fluid channeling housing.
The main plug, the spring, the bypass plug, the adapter and the holding piece, as well as the movable part of the thermostatic element or the movable and fixed parts of the thermostatic element are assembled to each other and form a module independent of the fluid channeling housing.
Said end of the lateral tubing is suited to cooperate by shape matching with a region of the fluid channeling housing through which the lateral passage leads to the chamber.
Said end of the lateral tubing and said region of the fluid channeling housing are planar, extending substantially parallel to the axis.
The cylindrical sleeve has a circular cross-section.
The adapter incorporates elements for attaching to the fluid channeling housing, wherein said elements are suited to be attached to the fluid channeling housing by elastic deformation, in particular by clipping.
The thermostatic device further comprises at least one added piece for attaching the adapter to the fluid channeling housing, e.g. a quarter-turn stirrup.

BRIEF DESCRIPTION OF THE DRAWINGS

The invention will be better understood upon reading the following description, given only as an example and making reference to the drawings wherein.

DETAILED DESCRIPTION OF EMBODIMENTS

FIGS. 1 to 5 show a thermostatic device 1 for regulating the flow of a fluid. The fluid is in particular, a cooling fluid, the thermostatic device 1 then belonging e.g. to a cooling circuit of an internal combustion engine, in particular of an engine of a motor vehicle.

Figure 1:
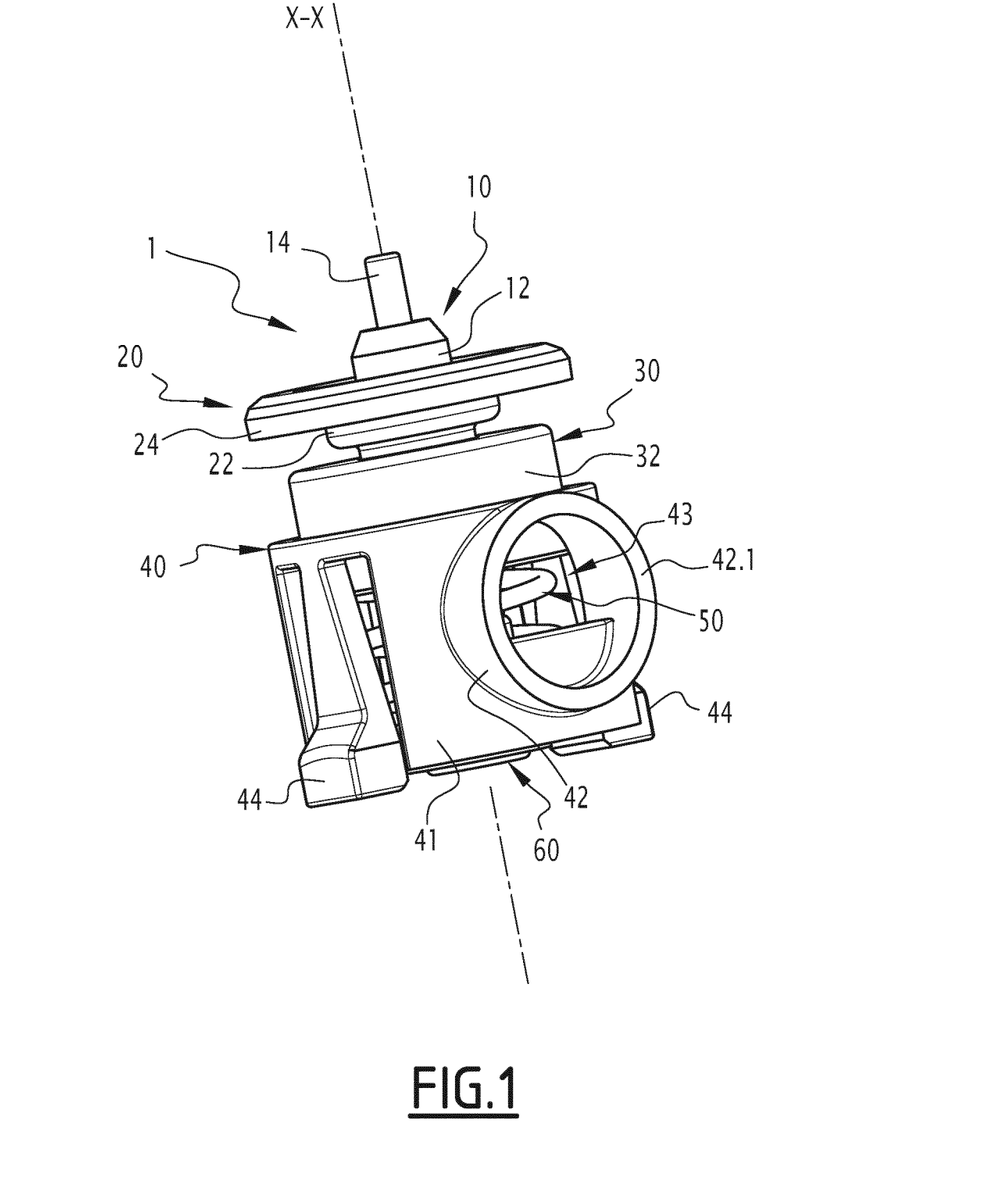
FIG. 1 is a perspective view of a thermostatic device according to the invention.
Figure 2:
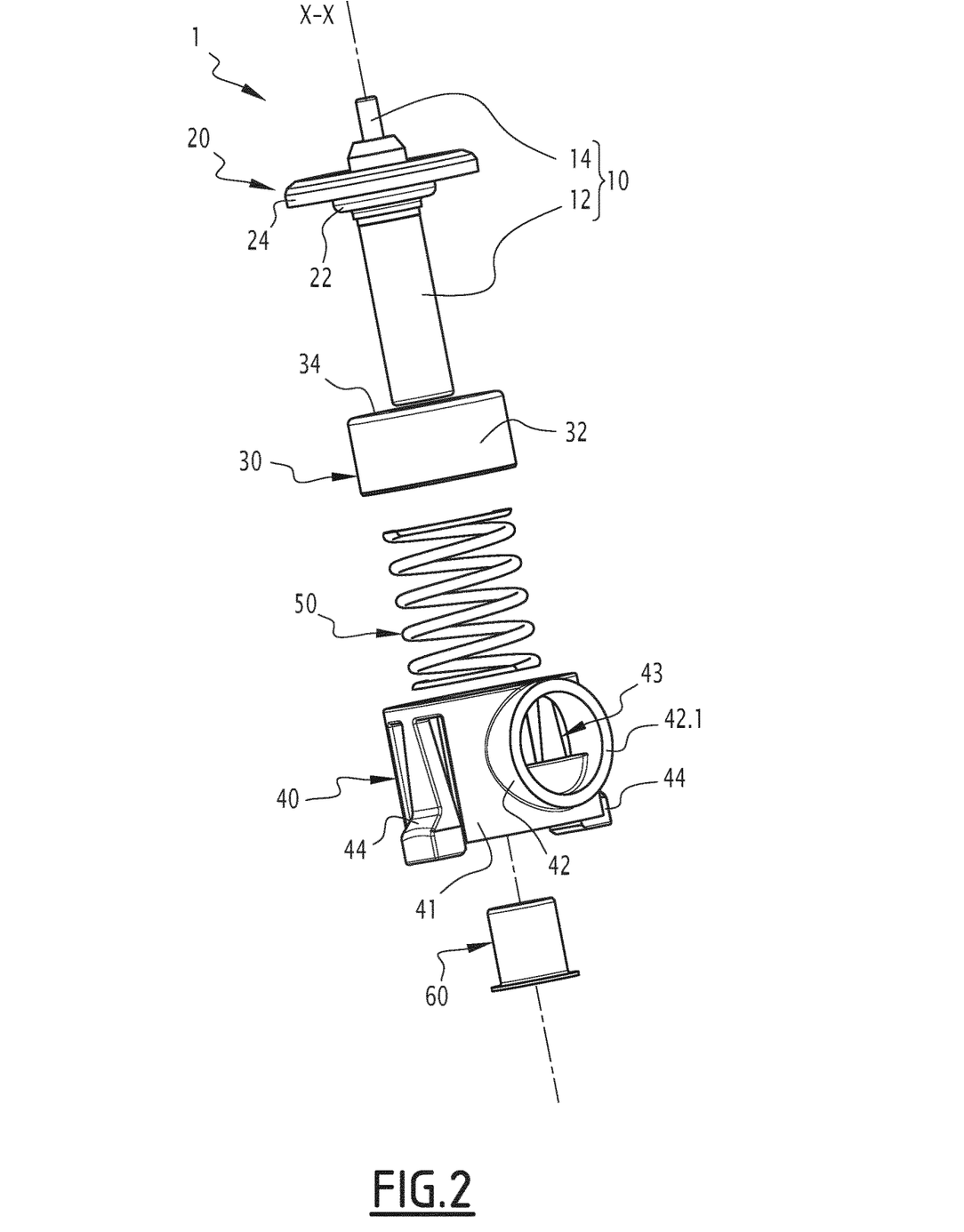
FIG. 2 is a view similar to FIG. 1, showing the thermostatic device in an exploded view.
Figure 3:
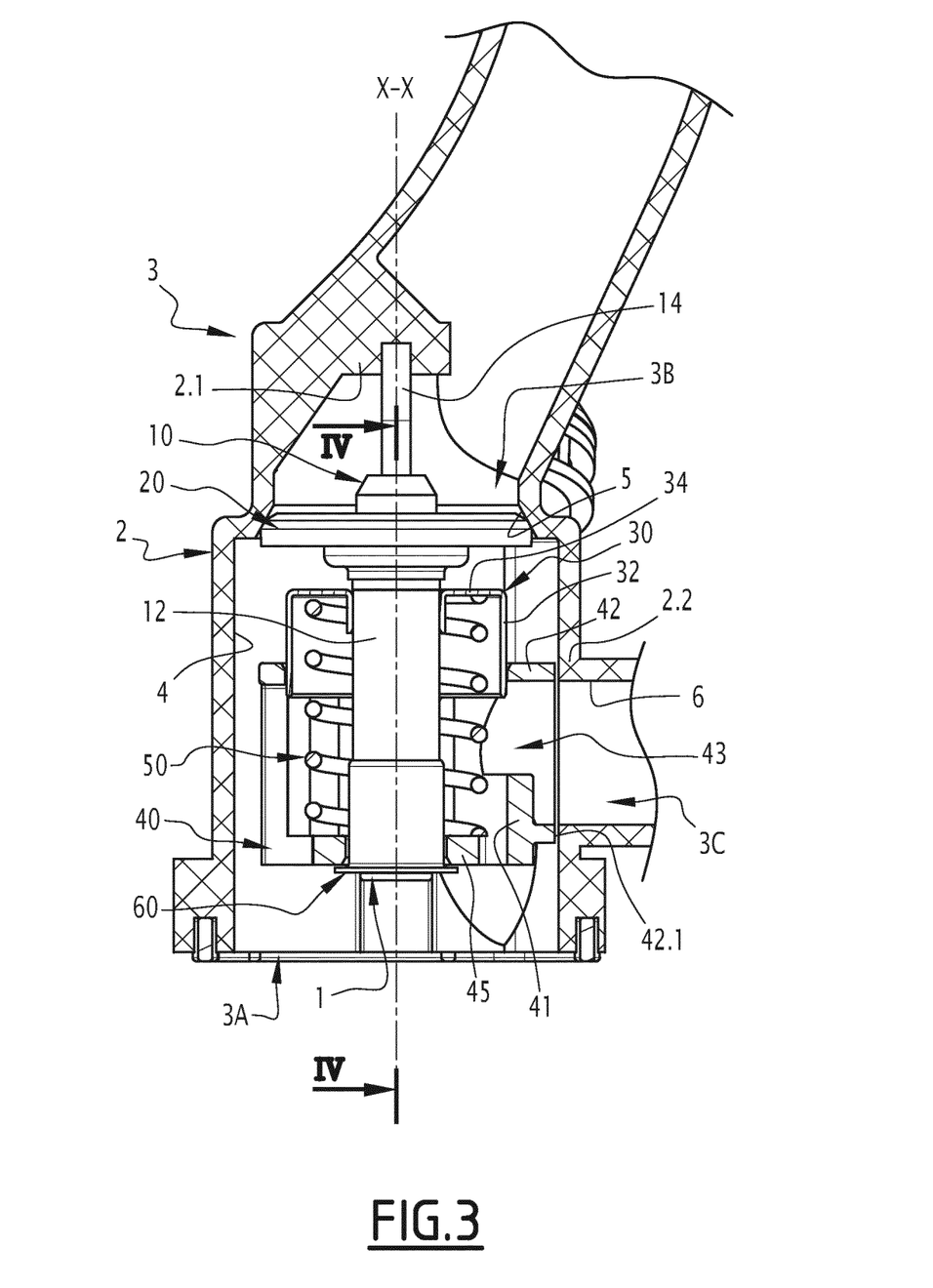
FIG. 3 is a longitudinal section of a thermostatic valve according to the invention, comprising the thermostatic device of FIG. 1.
Figure 4:
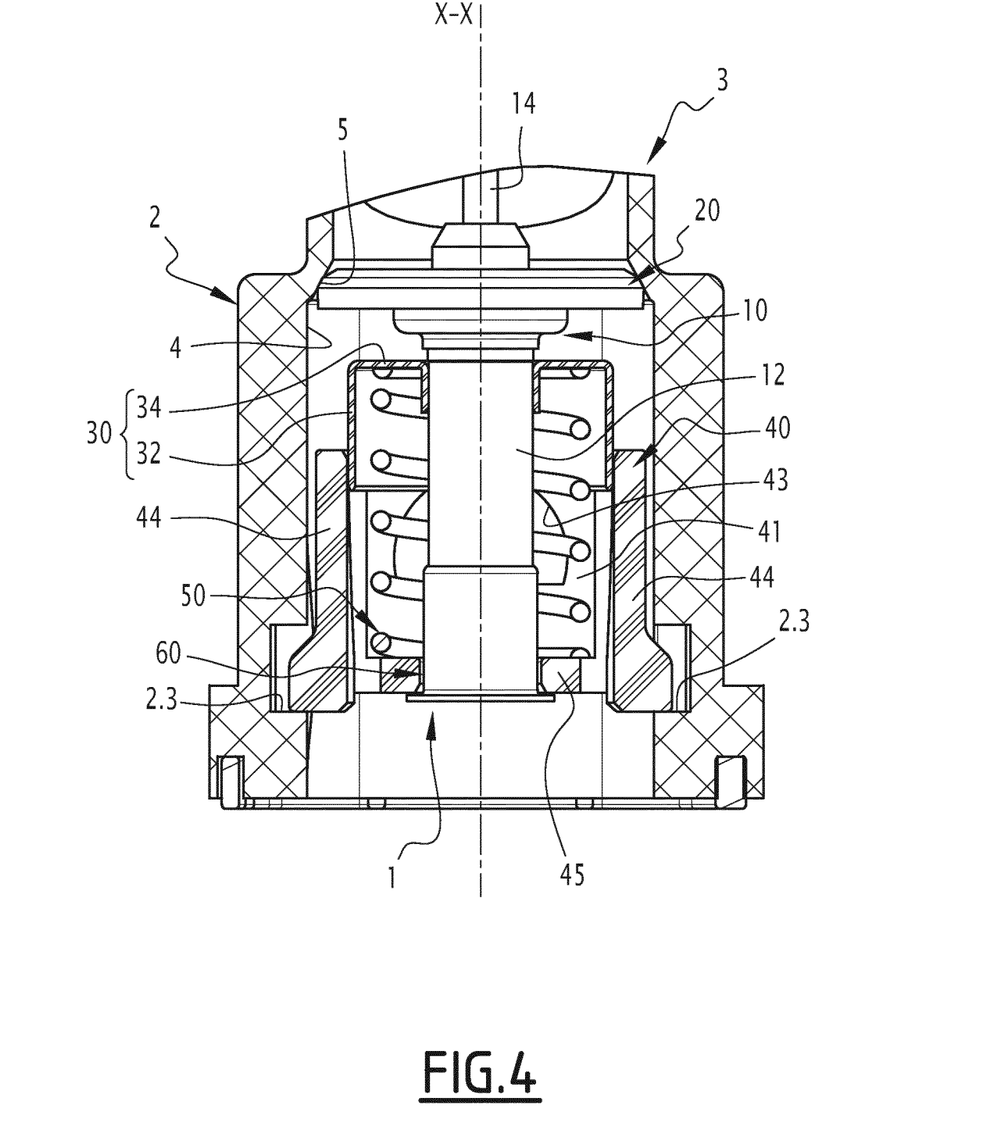
FIG. 4 is a section along line IV-IV of FIG. 3.
Figure 5:
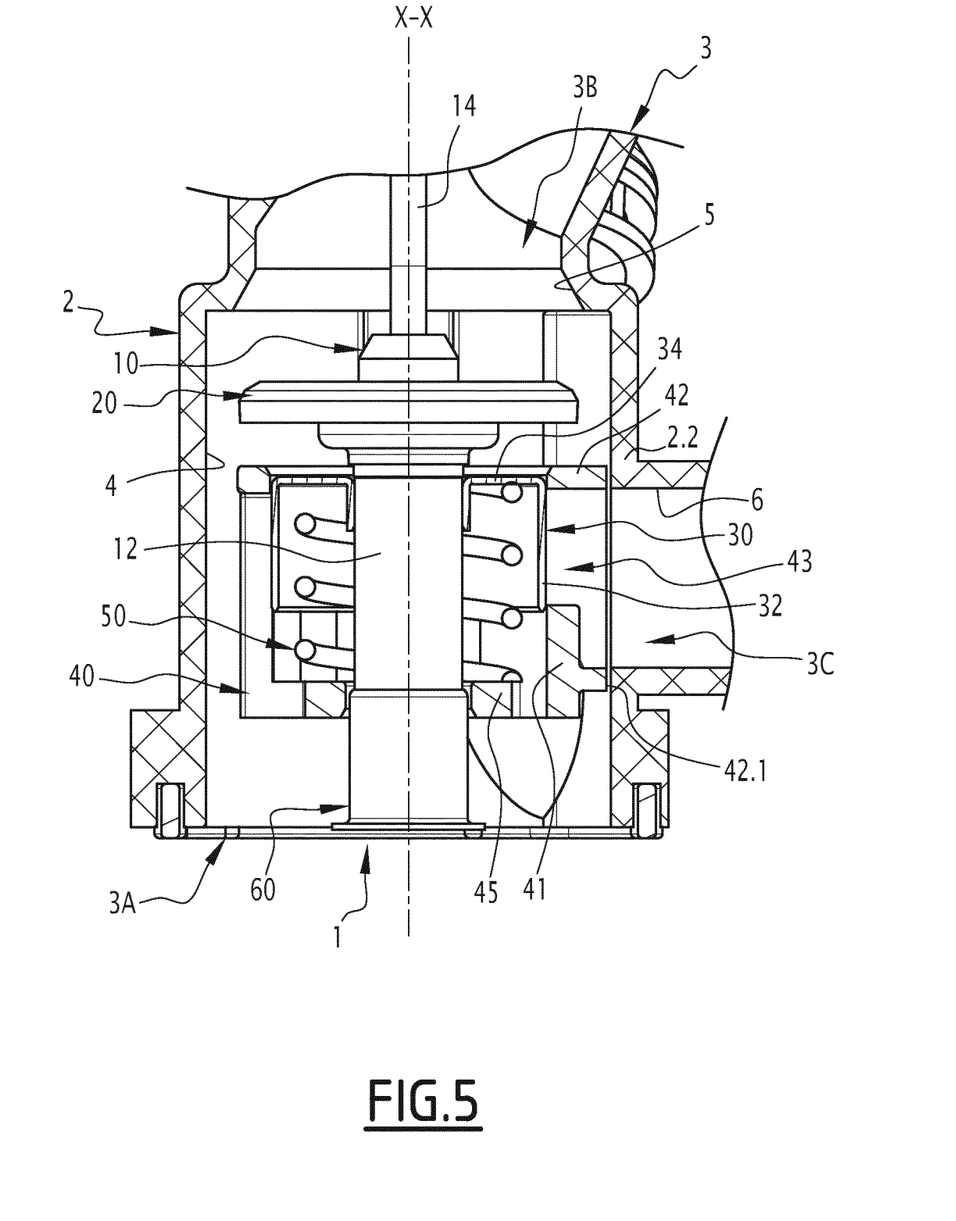
FIG. 5 is a view similar to FIG. 3, showing an operating configuration of the valve, different from the operating configuration shown in FIGS. 3 and 4.

The thermostatic device 1 is shown alone in FIGS. 1 and 2, whereas in FIGS. 3 to 5, the thermostatic device is installed in a housing 2 of a thermostatic valve 3.

In practice, in FIGS. 3 to 5, the housing 2 is shown only partially and schematically, the embodiment not being limited to the invention. In particular, the housing 2 can be either made as one piece or formed of a plurality of parts assembled which are fixed to one another. In all cases, when the valve 3 is in service, the housing 2 channels the fluid, advantageously defining three fluid flow channels 3A, 3B and 3C: the three channels form either a fluid inlet and two fluid outlets, or two fluid inlets and one fluid outlet for the valve 3. As an example of an application which will be mentioned again thereafter, when the valve 3 belongs to a cooling circuit of an engine, the channel 3A constitutes an inlet for a cooling fluid coming from the engine to cool, whereas, the channel 3B constitutes a first outlet of the cooling fluid, sending the latter to a heat exchanger, in particular a radiator, designed to lower the temperature of the fluid flowing through same, before said fluid being sent to the engine to cool, and the channel 3C constitutes a second outlet for the cooling fluid, which sends the latter directly to the engine to cool, without passing through the aforementioned heat exchanger. It is understood that the channel 3C forms a bypass for the cooling fluid, commonly referred to as bypass channel. Thus, the cooling fluid sent to the engine by the valve 3 comes from the outlets 3B and 3C of the latter and, after having cooled the engine, is sent back to the valve, more precisely to the channel 3A thereof.

The thermostatic device 1 is used for regulating the flow of the fluid through the housing 2, by distributing the fluid between the different channels 3A, 3B and 3C. In the example of application defined above, the thermostatic device 1 allows the fluid entering the housing via the channel 3A to be distributed between the outlets of the channels 3B and 3C. In all cases, the housing 2 delimits a chamber 4, where into lead each of the channels 3A, 3B and 3C and wherein the thermostatic device 1 is at least partially arranged when the valve 3 is in operation.

The thermostatic device 1 further comprises a thermostatic element 10 which is centered on a geometric axis X-X. The thermostatic element 10 includes a body 12, which contains a thermally expandable material, such as a wax, and which is substantially centered on the axis X-X. The thermostatic element 10 further comprises a piston 14, the central longitudinal geometric axis of which is aligned with the axis X-X and an axial end part of which is dipped into the thermally expandable material contained in the body 12. The body 12 and the piston 14 are movable in translation relative to each other along the axis X-X: under the effect of an expansion of the thermally expandable material, the piston 14 moves away from the body 12 by extending outside the latter, whereas during a contraction of the thermally expandable material, the piston is retractable inside the body 12.

The piston 14 is rigidly connected to the housing 2 inside the valve 3 when the latter is in service. More precisely, as is known per se, the end part of the piston 14, opposite the part dipped into the body 12, is rigidly connected to a region 2.1 of the housing 2, arranged across the axis X-X. In practice, various embodiments can be envisaged with regard to the rigid connection of the aforementioned end part of the piston 14 to the region 2.1 of the housing 2: the rigid connection can be made either solely by axial support, or by removable fastening such as clipping or sliding fitting, or by permanent rigid attachment such as force fitting, overmolding or addition of a mechanical holding system. In all cases, it is understood that, when the thermally expandable material contained in the body 12 expands or contracts, the piston 14 is held immobile with respect to the housing 2.

The thermostatic device 1 also comprises a main plug 20 which is movable along the axis X-X with respect to the housing 2 so as to control the flow of the fluid between the chamber 4 and the outside of the housing 2 via the channel 3B. More precisely, the main plug 20 is axially movable with respect to a seat 5, which is supported in a fixed manner by the housing 2 and located at the junction between the chamber 4 and the channel 3B. The main plug 20 is thus movable between:

a closed position, which is shown in FIGS. 3 and 4 and wherein the main plug 20 is pressed axially against the seat 5 so as to prevent the fluid from passing through this seat and from flowing between the chamber 4 and the outside of the housing via the channel 3B, and an open position, which is shown in FIG. 5 and wherein the main plug 20 is moved away from the seat 5 so as to allow the fluid to flow between the chamber 4 and the outside of the housing via the channel 3B, by passing through the seat 5.

In the example of application defined above, at least some of the fluid entering the chamber 4 via the channel 3A thus passes into the outlet of the channel 3B when the main plug 20 is in the open position. When the main plug 20 is in the closed position, said main plug prevents the fluid entering the chamber 4 via the channel 3A from reaching the outlet of the channel 3B.

The structural and geometric specificities of the seat 5 are not limited to the invention and can be different from the example of the figures wherein the seat 5 is frusto-conical and integral with the rest of the housing 2.

In order to control the movement of the main plug 20, the latter is connected to the body 12 of the thermostatic element 10 so that, when the valve 3 is in use, the axial movement of the body 12 with respect to the housing 2, resulting from the expansion of the thermally expandable material, causes a corresponding movement of the main plug 20 so as to move the latter from the closed position to the open position. According to a practical embodiment, which is implemented in the embodiment considered in the figures, the main plug 20 is rigidly connected to the body 12.

In the example of embodiment considered here, the main plug 20 comprises a rigid frame 22, typically made of metal, which is substantially centered on the axis X-X and the outer periphery of which, i.e. the periphery radially opposite the axis X-X, is provided, e.g. by overmolding, with a flexible sealing gasket 24, typically made of polymer or rubber. The sealing gasket 24 forms the part of the main plug 20 which mates, by pressing axially, with the seat 5 of the housing 2 so as to control the flow of the fluid between the chamber 4 and the outside of the housing via the channel 3B, whereas the frame 22 forms the part of the main plug 20 which mates with the body 12 of the thermostatic element 10 for connecting the main plug to the body 12. Thus, the frame 22 is e.g. fitted tightly through the body 12 of the thermostatic element 10, by a fixed connection between the main plug 20 and the body 12. Given the embodiment thereof, the main plug 20 considered here is similar to a flap. Of course, other embodiments can be envisaged for the main plug 20, without limiting the invention.

The thermostatic device 1 further comprises a bypass plug 30 which is movable along the axis X-X with respect to the housing 2 so as to control the flow of the fluid between the chamber 4 and a lateral passage 6 of the housing 2. As can be seen clearly in FIGS. 3 and 5, the lateral passage 6 forms the channel 3C and leads to the chamber 4 transversely to the axis X-X, or even radially to the axis X-X, as in the example considered in the figures. In other words, the lateral passage 6 extends from the chamber 4 along a transverse, or even radial, direction to the axis X-X. Of course, at a distance from the chamber 4, the orientation of the lateral passage 6 with respect to the axis X-X is not limited to the invention: thus, outside the junction zone between the lateral passage 6 and the chamber 4, the lateral passage 6 can be elbowed or extended with an inclination different from the direction along which lateral passage leads to the chamber 4.

As can be clearly seen in FIGS. 2 to 5, the bypass plug 30 comprises a cylindrical sleeve 32, which is substantially centered on the axis X-X and which, as explained thereafter, acts on the flow of the fluid between the chamber 4 and the lateral passage 6. The bypass plug 30 further comprises a frame 34 which rigidly connects the cylindrical sleeve 32 to the body 12 of the thermostatic element 10. The embodiment of the frame 34 does not limit the invention as long as the frame 34 provides a rigid connection between the bypass plug 30 and the body 12 of the thermostatic element 10 so that the bypass plug 30 allows the fluid to flow between the chamber 4 and the lateral passage 6 when the main plug 20 is in the closed position whereas the bypass plug 30 prevents the fluid from flowing between the chamber 4 and the lateral passage 6 when the main plug 20 is in the open position. In the example of embodiment considered in the figures, the frame 34 is produced in the form of rim, stamped at an axial end of the cylindrical sleeve 32, the rim fitting tightly through the body 12 of the thermostatic element 10. Multiple other embodiments can be envisaged.

The thermostatic device 1 further comprises an adapter 40 which, in the assembled state of the valve 3, is arranged in the chamber 4.

As can be seen in FIGS. 1 to 5, the adapter 40, includes a tubular body 41 which is substantially centered on the axis X-X. The inner lateral face of the tubular body 41 fits onto the outer lateral face of the cylindrical sleeve 32, allowing the latter to be neatly inserted so it can slide along the axis X-X inside the tubular body 41. Advantageously, the cylindrical sleeve 32 has a circular cross-section the outside diameter of which is then substantially equal to the inside diameter of the circular cross-section of the tubular body 41: in such a case, the cylindrical sleeve 32 can neatly slide inside the tubular body 41 whatever the corresponding angular positioning thereof about the axis X-X, which in particular, facilitates the assembly between the bypass plug 30 and the adapter 40. In all cases, the tubular body 41 is advantageously perforated so as to facilitate the flow of the fluid there-through.

As can be seen clearly in FIGS. 1 to 3 and 5, the adapter 40 also comprises a lateral tubing 42 which extends from the external lateral face of the tubular body 41. At the end thereof turned toward the tubular body 41, the lateral tubing 42 leads inside the tubular body 41 along a transverse, or even radial direction to the axis X-X via a hole 43, whereas, opposite the tubular body 41, the lateral tubing 42 has a free end 42.1.

The hole 43 is thus delimited through the tubular body 41, placing the inside of the tubular body 41 in fluidic communication with the lateral tubing 42. Along the direction of the axis X-X, the hole 43 has a dimension smaller than the axial dimension of the cylindrical sleeve 32. Along a direction peripheral to the axis X-X, the hole 43 occupies a limited peripheral portion which corresponds, either completely or partially, to the peripheral portion occupied by the lateral tubing 42. In the assembled state of the valve 3, the cylindrical sleeve 32 covers and thus completely closes where appropriate, the hole 43 when the main plug 10 is in the open position, as in FIG. 5, whereas the cylindrical sleeve 32 leaves the hole 43 open, by displacing axially from the latter, when the main plug 10 is in the closed position as in FIGS. 3 and 4. In practice, the precise geometric contour of the hole 43 is not limited to the invention, the contour being shaped in particular depending upon the axial dimension of the cylindrical sleeve 32 so as to enable the latter to completely close the hole 43 as in FIG. 5.

The end 42.1 of the lateral tubing 42 allows the latter to be connected to the lateral passage 6. For this purpose, in the assembled state of the valve 3, the end 42.1 is arranged in alignment with the opening end of the lateral passage 6 into the chamber 4, as can be seen in FIGS. 3 and 4. In particular, in order to limit fluid leakage at the connection between the end 42.1 of the lateral tubing 42 and the lateral passage 6, the end 42.1 is advantageously designed to mate through matching shapes with the region 2.2 of the housing 2 through which the lateral passage 6 leads to the chamber 4: in the example of embodiment considered in the figures, the end 42.1 of the lateral tubing 42 and the region 2.2 of the housing 2 are thus designed to be flat, extending substantially parallel to the axis X-X. Of course, other geometries can be envisaged at the matching interface between the end 42.1 of the lateral tubing 42 and the region 2.2 of the housing 2. More generally, it is understood that the lateral tubing 42 allows the adapter 40 to be adapted to various geometrical specificities of the housing 2 in connection with the lateral passage 6 of the latter.

Whatever the embodiments of the tubular body 41 and of the lateral tubing 42 of the adapter 40, the latter is designed to be arranged inside the chamber 4 by being fixedly added to the housing 2. For this purpose, in the embodiment shown in FIGS. 1 to 5, the adapter 40 incorporates the fastening brackets 44 which are to deform elastically with respect to the rest of the adapter 40. When the adapter 40 is assembled onto the housing 2, the fastening brackets 44 are deformed, in particular by being folded down toward the axis X-X, so as to allow the adapter 40 to be inserted inside the chamber 4 without axially interfering with the housing 2. Once the adapter 40 is placed inside the chamber 4, the fastening brackets 44 tend to return to the initial undeformed configuration thereof, by elastic return, in particular by extending in the opposite direction to the axis X-X, so as to penetrate into ad hoc grooves 2.3 of the housing 2. The fastening brackets 44 then mate with the grooves 2.3 along the direction of the axis X-X, which holds the adapter 40 axially in place inside the chamber 4, as can be seen clearly on FIG. 4. Thus, the fastening brackets 44 allow the adapter 40 to be attached to the housing 2 by elastic clipping. Of course, the fastening brackets 44 which have just been described and which are shown in the figures, are only one example of fastening elements the adapter 40 can incorporate and which enable the latter to be attached by elastic deformation to the housing 2.

The thermostatic device 1 further comprises a spring 50 which, in the assembled state of the valve 3, is designed to return the body 12 of the thermostatic element 10 toward the piston 14 of said thermostatic element during a contraction of the thermally expandable material so as to move the main plug 20 from the open position thereof to the closed position thereof. To this end, the spring 50 is functionally interposed between the body 12 and the piston 14 of the thermostatic element 10 so as to be compressed along the axis X-X when the body 12 and the piston 14 move axially away from one another. Structurally, a plurality of arrangements are possible for the spring 50 within the thermostatic device 1.

According to an advantageous variant of arrangement which is shown in the figures, the spring 50 presses axially, by one of the axial ends thereof, against the adapter 40, whereas, by the opposite axial end thereof, the spring 50 presses axially either directly against the body 12 of the thermostatic element, or against one of the plugs 20 and 30. For this purpose, the adapter 40 comprises a transverse wall 45 which, as can be seen clearly in FIGS. 3 to 5, extends across the tubular body 41 and against which the spring 50 is pressed along the axis X-X. The spring 50 is thus embedded into the adapter 40. Furthermore, the thermostatic device 1 then advantageously comprises, as an additional piece, a bushing 60, which is rigidly attached to the body 12 of the thermostatic element 10 and which is suited for holding the adapter 40 axially with respect to the body 12 against the thrust of the spring 50 before the adapter is fixedly added to the housing 2, as in FIG. 1. The bush 60 is only an example of a holding piece, which allows the adapter 40, the body 12 of the thermostatic element 10 and the spring 50 to be held together as long as the thermostatic device 1 is not installed in the housing 2, it being noted that, once the adapter 40 is received in the chamber 4 and thus fixed to the housing 2, said holding piece no longer has any function. Whatever the embodiment of such holding piece, such as the bush 60, it is understood that the thermostatic element 10, the plugs 20 and 30, the adapter 40, the spring 50 and the holding piece are advantageously assembled together to form a module, as shown in FIG. 1, independent of the housing 2. Such module can thus be handled in one piece, independently of the housing 2, until it is installed inside the latter.

The operation of the valve 3 will now be described with reference to FIGS. 3 to 5, in the context of the example of application of said valve, as mentioned above.

In the operating configuration shown in FIGS. 3 and 4, the fluid entering the chamber 4 via the channel 3A is prevented by the main plug 20 in the closed position from crossing through the seat 5 and hence from flowing through the channel 3B and is sent entirely into the lateral passage 6, thus flowing through the channel 3C, because of the opening of the hole 43 by the cylindrical sleeve 32 of the bypass plug 30, the fluid flowing successively through the tubular body 41, through the hole 43 and through the lateral tubing 42.

If the temperature of the fluid feeding the channel 3A increases, the thermally expandable material of the thermostatic element 10 expands, the heat of the fluid being transmitted to the thermally expandable material because the body 12 of the thermostatic element is swept by fluid currents. The axial displacement of the body 12 with respect to the piston 14, which is fixed with respect to the housing 2, causes the corresponding axial displacement of the main plug 20 and of the bypass plug 30. The main plug 20 then moves away progressively from the seat 5, opening the flow of fluid between the chamber 4 and the channel 3B, whereas, at the same time, the bypass plug 30 progressively closes the hole 43, by covering the latter by the cylindrical sleeve 32. The fluid taken in via the channel 3A is then distributed between the channels 3B and 3C.

If the temperature of the fluid feeding the channel 3A continues to increase, the main plug 20 moves further away from the seat 5, while the hole 43 closes further, in a corresponding manner, until it is completely closed, as shown in FIG. 5. All the fluid taken in via the channel 3A is then sent into the channel 3B.

If the temperature of the fluid feeding the channel 3A then decreases, the thermally expandable material of the thermostatic element 10 contracts and, under the decompression effect of the spring 50, the main plug 20 progressively approaches the seat 5 and the bypass plug 30 progressively uncovers the hole 43.

Figure 6:
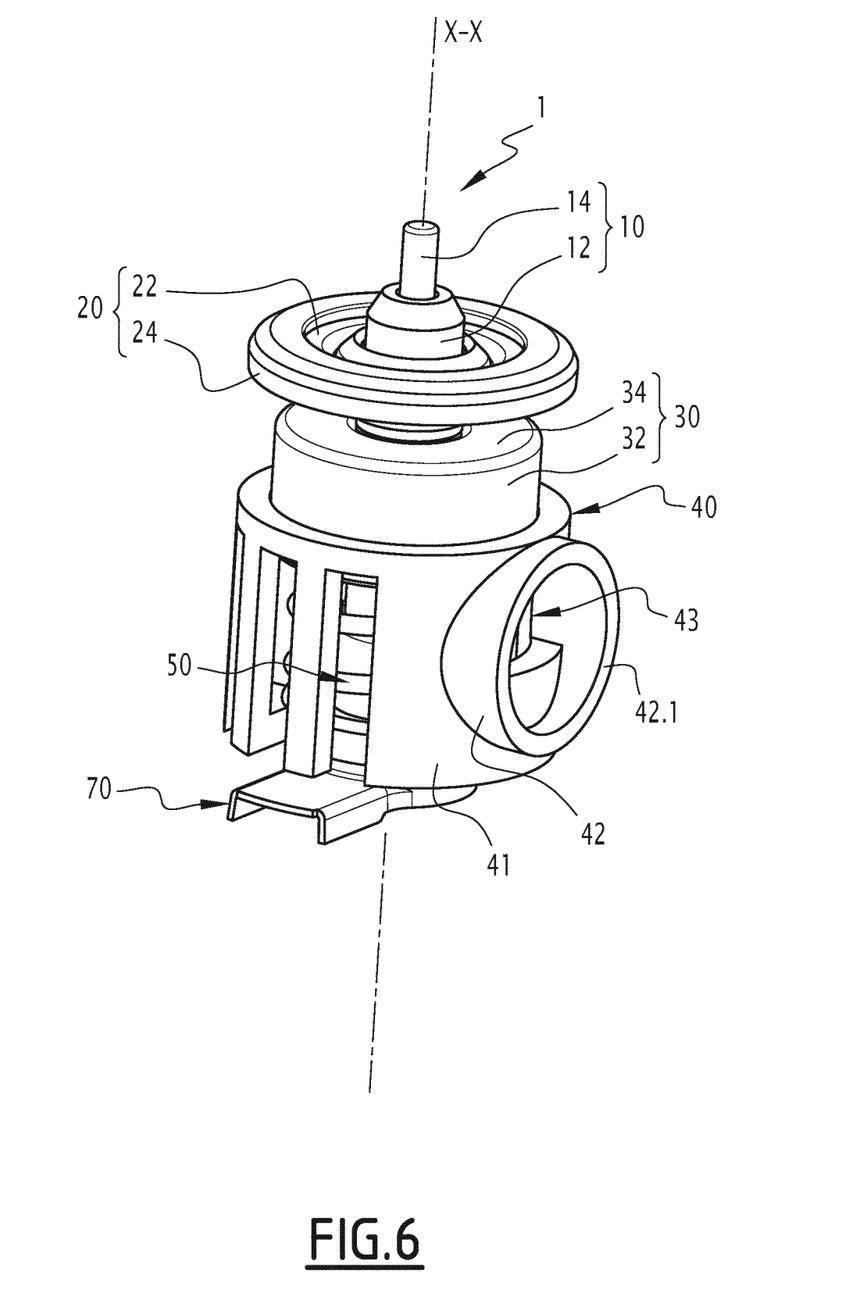
FIG. 6 is a view similar to FIG. 1, illustrating a variant of the thermostatic device according to the invention.
Figure 7:
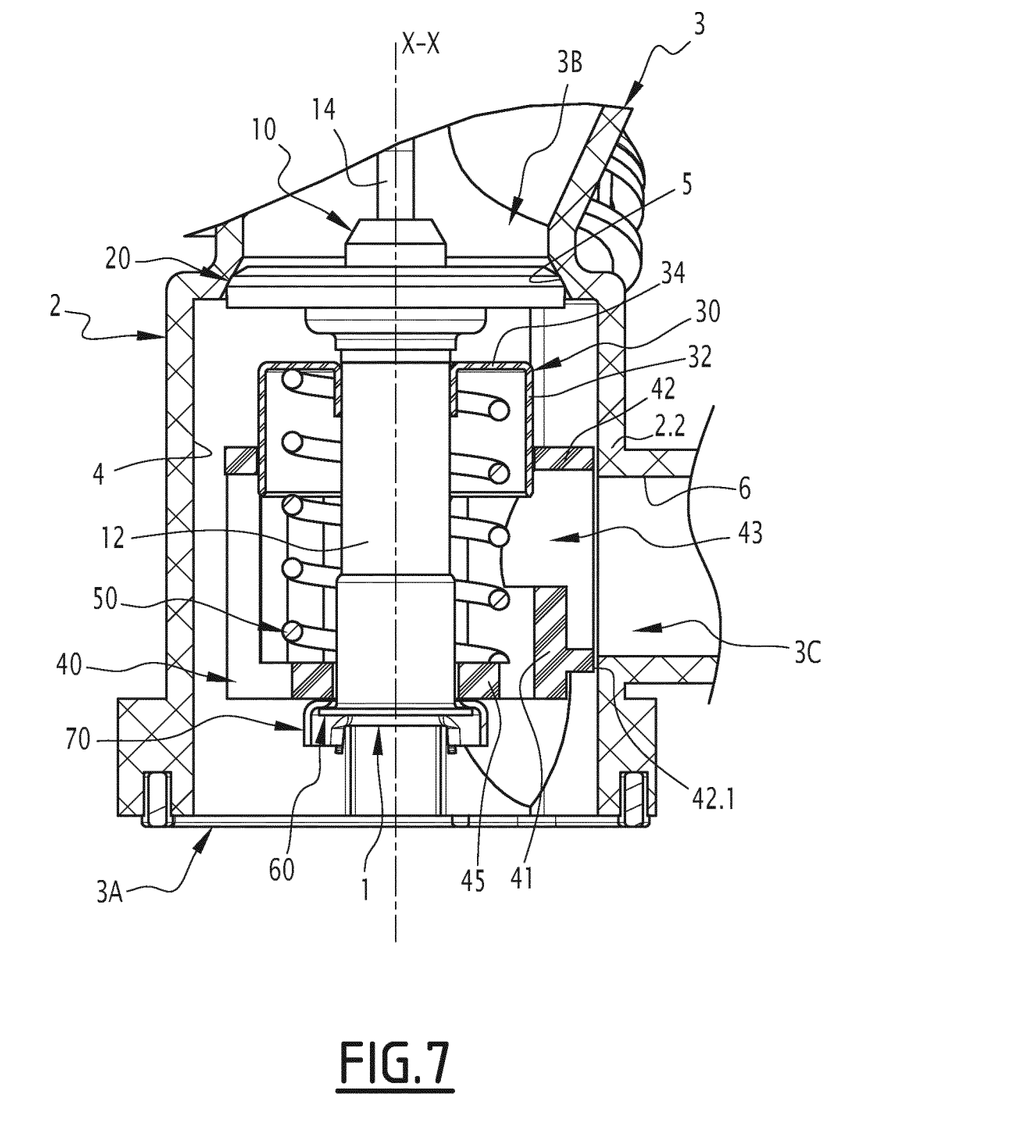
FIG. 7 and FIG. 8 are views similar to FIGS. 3 and 4, respectively, illustrating a valve equipped with the thermostatic device of FIG. 6.
Figure 8:
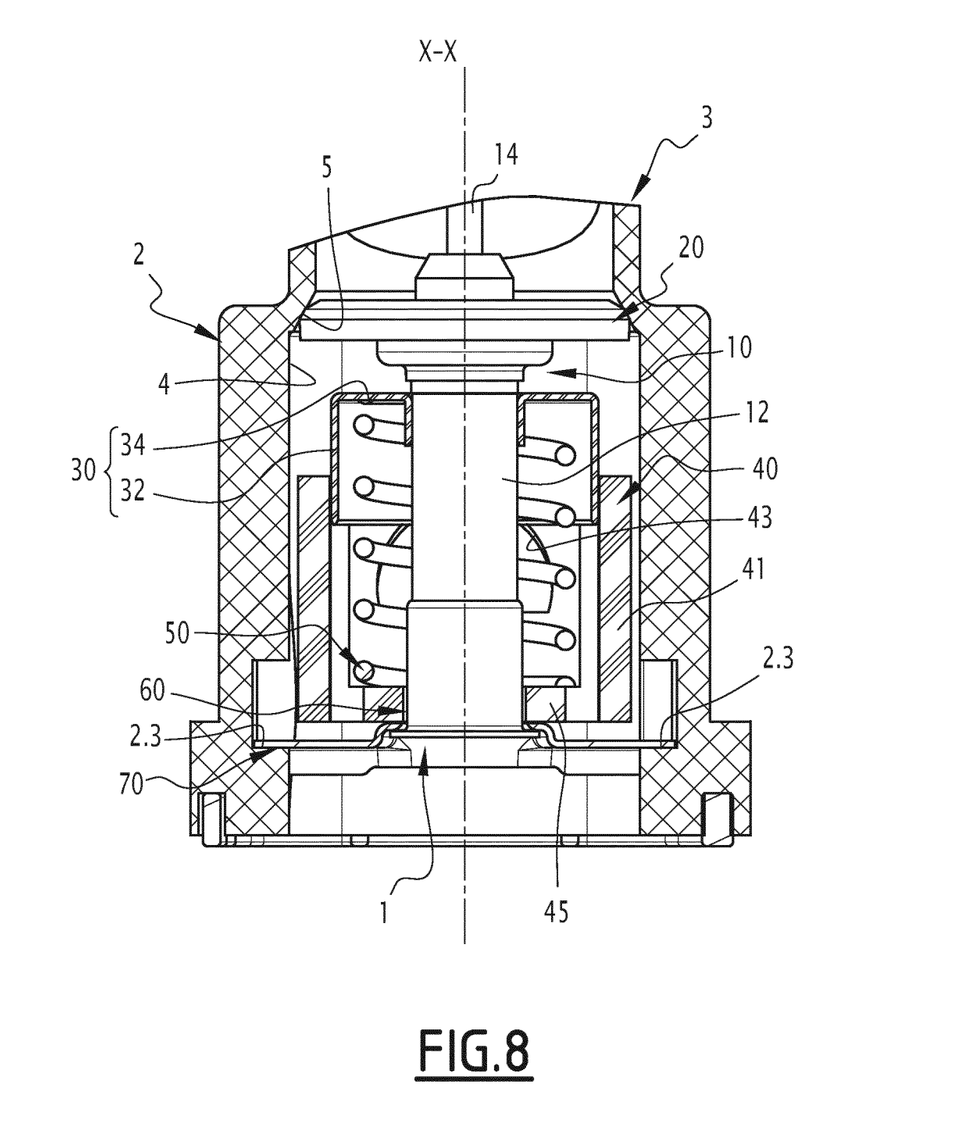

Various arrangements and variants of the thermostatic device 1 and of the valve 3 as described up to now, are also conceivable. As examples:
- rather than the adapter 40 incorporates fastening elements, such as the fastening brackets 44, the attachment of said adapter to the housing 2 may be provided by an added piece, as in the variant of the thermostatic device 1 shown in FIGS. 6 to 8 wherein the added piece, referenced 70, is a so called "quarter turn" stirrup; such stirrup is in the form of a strap, which extends perpendicularly to the axis X-X and which is axially connected to the body 12 of the thermostatic element 10, whereas being apt to pivot freely about the axis X-X with respect to the body 12 so as to switch from a first orientation, wherein the strip does not mate axially with the housing 2, to a second orientation, which is shown in FIGS. 7 and 8 and wherein the opposite ends of the strip axially mate with the housing 2, being received in grooves of the latter, similar to the grooves 2.3;
- the embodiment of the thermostatic element 10 is not limiting; in particular, the body 12 and the piston 14 of the thermostatic element can have various diameters;
- the thermostatic element 10 can, optionally, be controlled, i.e. have built-in in the piston 14 thereof, an electrical heating resistor, electrically connected through the region 2.1 of the housing 2; in such a case, the mechanical connection between the piston 14 and the region 2.1 of the housing is designed to provide the corresponding electrical connection, which can be provided by an ad hoc connection of the piston 14 when the thermostatic device 1 is installed in the housing 2 or by a prior assembly between the housing 2 and the piston 14 without the rest of the device 1; in the latter case, the module which has been mentioned above as being independent of the housing 2 corresponds to the assembly of the body 12 of the thermostatic element, the plugs 20 and 30, the adapter 40, the spring 50 and the bush 60 or a holding piece similar to said bush;
- rather than rigidly connecting the piston 14 of the thermostatic element 10 to the housing 2, the body 12 of the thermostatic element can be designed to be fixed with respect to the housing, the piston 14 then forming the movable part of the thermostatic element, and having the driving function described so far for the body 12; and/or
- rather than being rigidly connected to the movable part of the thermostatic element 10, the main plug 20 can be mounted on this movable part with freedom of movement along the axis X-X, provided that same is associated with a dedicated return spring; the main plug 20 thus has a relief function in the event of overpressure between the chamber 4 and the channel 3B.

The invention claimed is:

1. A thermostatic device regulating flow of a fluid, comprising:
  a thermostatic element, comprising:
    a thermally expandable material;
    a fixed part rigidly connected to a fluid channeling housing; and
    a movable part movable along an axis with respect to said fixed part, by moving away from said fixed part under the action of expansion of said thermally expandable material;
  a main plug, movable connected to said movable part so that, under the action of expansion of said thermally expandable material, said movable part moves the main plug along the axis with respect to the fluid channeling housing from a closed position, wherein the main plug is axially pressed against a fixed seat of the fluid channeling housing so as to prevent fluid from flowing between a chamber of the fluid channeling housing and the outside of the fluid channeling housing by crossing through the fixed seat, to an open position, wherein the main plug is moved away from the fixed seat so as to allow fluid to flow between the chamber and the outside of the fluid channeling housing by crossing through the fixed seat;

an adapter, fixedly added to the fluid channeling housing inside the chamber, the adapter comprising:
   a tubular body, which is substantially centered on the axis; and
   a lateral tubing, which extends from an outer lateral face of said tubular body, has an end opposite to said tubular body, the end connecting to a lateral passage of the fluid channeling housing leading to the chamber transversely to the axis, and leads to the inside of said tubular body in a direction transverse to the axis, via a hole; and a bypass plug comprising a cylindrical sleeve substantially centered on the axis, neatly fitted in the tubular body of the adapter and slidable along the axis with respect to the fluid channeling housing, the bypass plug being rigidly connected to said movable part of said thermostatic element so as to allow fluid to flow between the chamber and the lateral passage when said main plug is in the closed position, in that said cylindrical sleeve leaves the hole open when said main plug is in the closed position, and to prevent fluid from flowing between the chamber and the lateral passage when said main plug is in the open position, in that the hole is closed by said cylindrical sleeve when said main plug is in the open position.

2. The thermostatic device according to claim 1, further comprising a spring which is compressed along the axis and which returns said movable part toward said fixed part of said thermostatic element during contraction of the thermally expandable material so as to move said main plug from the open position to the closed position.

3. The thermostatic device according to claim 2, wherein said spring is axially pressed against said adapter.

4. The thermostatic device according to claim 3, further comprising a holding piece which is rigidly attached to said movable part of said thermostatic element and which is suited to axially hold said adapter with respect to said movable part of said thermostatic element against thrust of said spring before said adapter is fixedly added to the fluid channeling housing.

5. The thermostatic device according to claim 4, wherein said main plug, said spring, said bypass plug, said adapter and said holding piece, as well as said movable part of said thermostatic element or said movable and said fixed parts of said thermostatic element are assembled to each other and form a module independent of the fluid channeling housing.

6. The thermostatic device according to claim 1, wherein the end of said lateral tubing is suited to cooperate by shape matching with a region of the fluid channeling housing through which the lateral passage leads to the chamber.

7. The thermostatic device according to claim 6, wherein the end of said lateral tubing and the region of the fluid channeling housing are planar, extending substantially parallel to the axis.

8. The thermostatic device according to claim 1, wherein said cylindrical sleeve has a circular cross-section.

9. The thermostatic device according to claim 1, wherein said adapter further comprises elements attaching to the fluid channeling housing by elastic deformation.

10. The thermostatic device according to claim 1, further comprising at least one added piece attaching said adapter to the fluid channeling housing.

11. A thermostatic valve, comprising:
   the thermostatic device according to claim 1; and
   the fluid channeling housing comprising:
      the fixed seat against which the main plug of said thermostatic device is pressed axially when the main plug is in the closed position;
      the chamber inside which the adapter of said thermostatic device is attached to the fluid channeling housing; and
      the lateral passage, which leads to the chamber transversely to the axis, the flow of a fluid between the lateral passage and the chamber being controlled by the bypass plug of said thermostatic device.

12. The thermostatic device according to claim 9, wherein said elements are attached to the fluid channeling housing by clipping.

13. The thermostatic device according to claim 10, wherein said at least one added piece attaching said adapter to the fluid channeling housing comprises a quarter-turn stirrup.

\* \* \* \* \*